United States Patent

[11] 3,603,204

| [72] | Inventors | Lloyd E. Anderson, Sr.<br>Des Moines, Iowa;<br>George C. Harper, Coraopolis, Pa.;<br>William Leber, Pittsburgh, Pa.; Charles G.<br>Miller, Monterrey N. L., Mexico |
|---|---|---|
| [21] | Appl. No. | 801,030 |
| [22] | Filed | Feb. 20, 1969 |
| [45] | Patented | Sept. 7, 1971 |
| [73] | Assignee | Pittsburgh-DesMoines Steel Company<br>Pittsburg, Pa. |

[54] WORK-MOUNTED MACHINING AND FINISHING DEVICE
26 Claims, 13 Drawing Figs.

[52] U.S. Cl. .................................................. 90/12,
90/15
[51] Int. Cl. ............................................. B23c 1/20,
B23c 3/00
[50] Field of Search ....................................... 90/11, 12,
14, 15

[56] References Cited
UNITED STATES PATENTS

| 3,145,622 | 8/1964 | Rust et al. | 90/12 X |
| 3,460,435 | 8/1969 | Hucks et al. | 90/15 |

*Primary Examiner*—Gil Weidenfeld
*Attorney*—Shoemaker and Mattare

ABSTRACT: A pivot support means is adapted to be connected with a workpiece such as a tank or the like, and a pivot arm means is pivotally supported by the support means. A machining means for milling or drilling the workpiece is carried adjacent the outer end of the pivot arm means, this machining means being both radially and vertically adjustable with respect to the pivot arm means. Positive drive means is interconnected between the support means and the pivot arm means for moving the pivot arm means about a pivot axis. Guide means is supported by the outer surface of the associated workpiece and is interengageable with antifriction wheel means on the outer end of the pivot arm means to guide movement of the pivot arm means with respect to the workpiece.

INVENTORS
LLOYD E. ANDERSON, SR.,
GEORGE C. HARPER,
WILLIAM LEBER &
CHARLES G. MILLER
BY Shoemaker and Mattare
ATTORNEYS

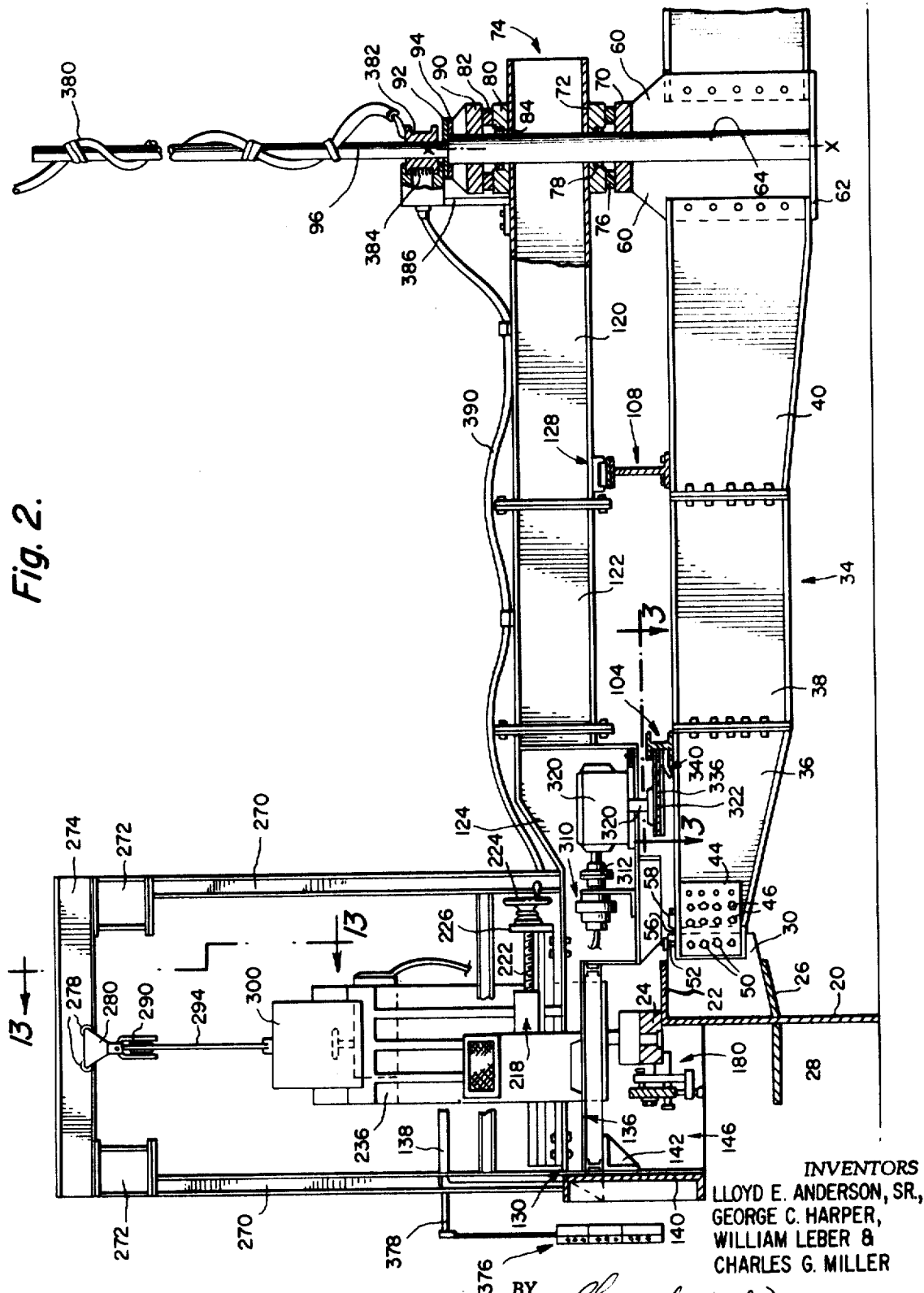

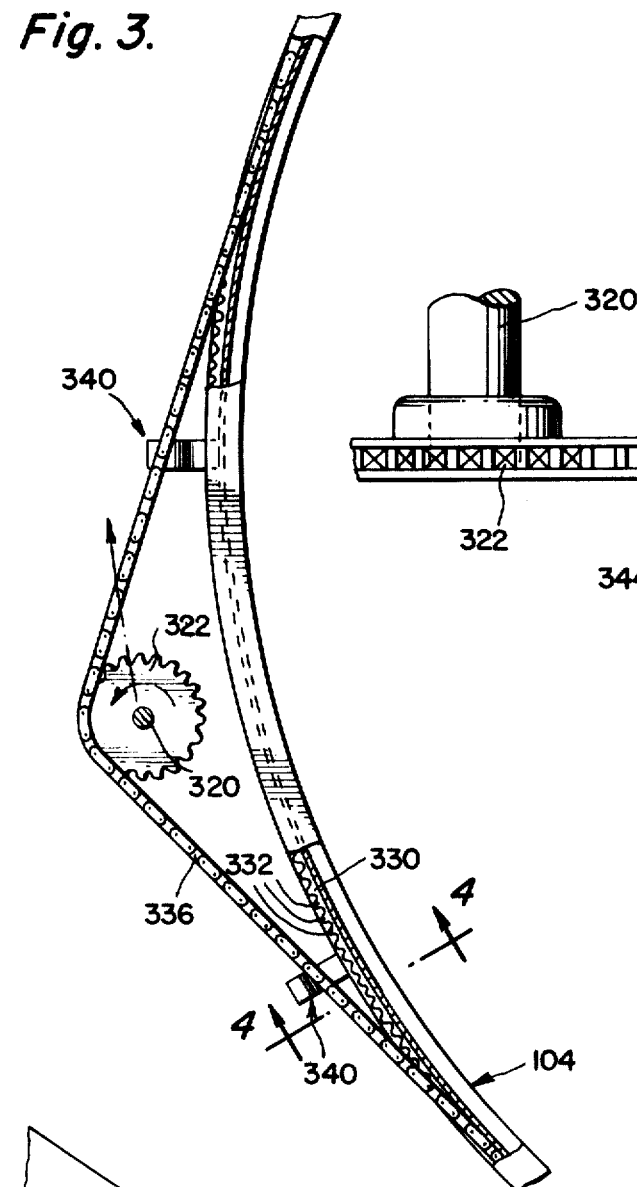
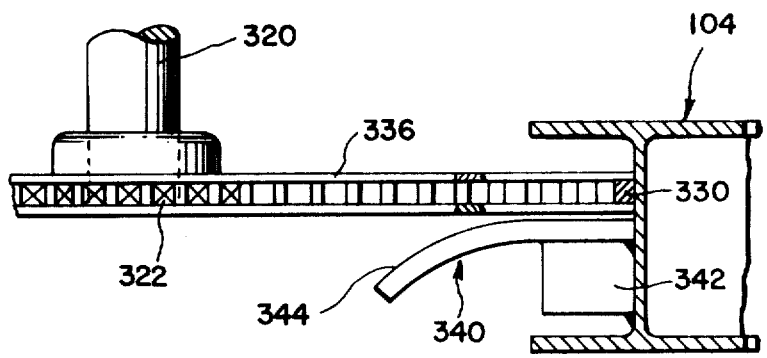
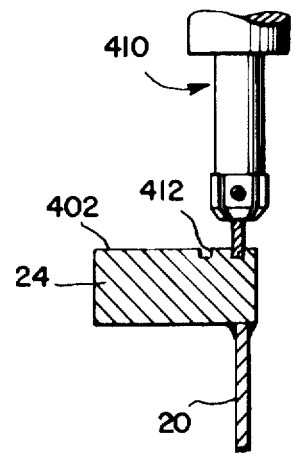
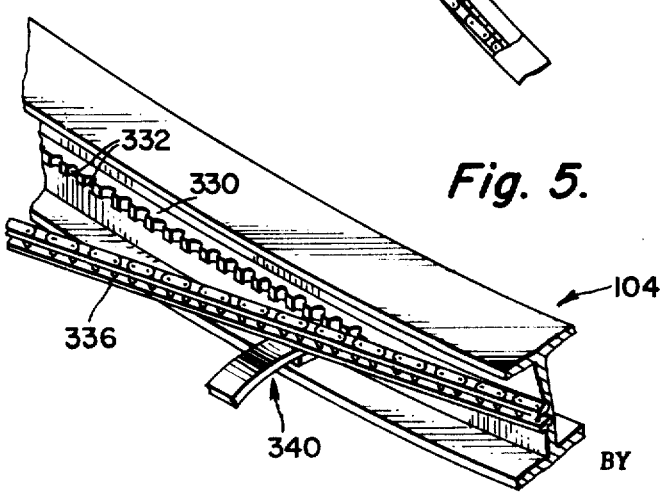

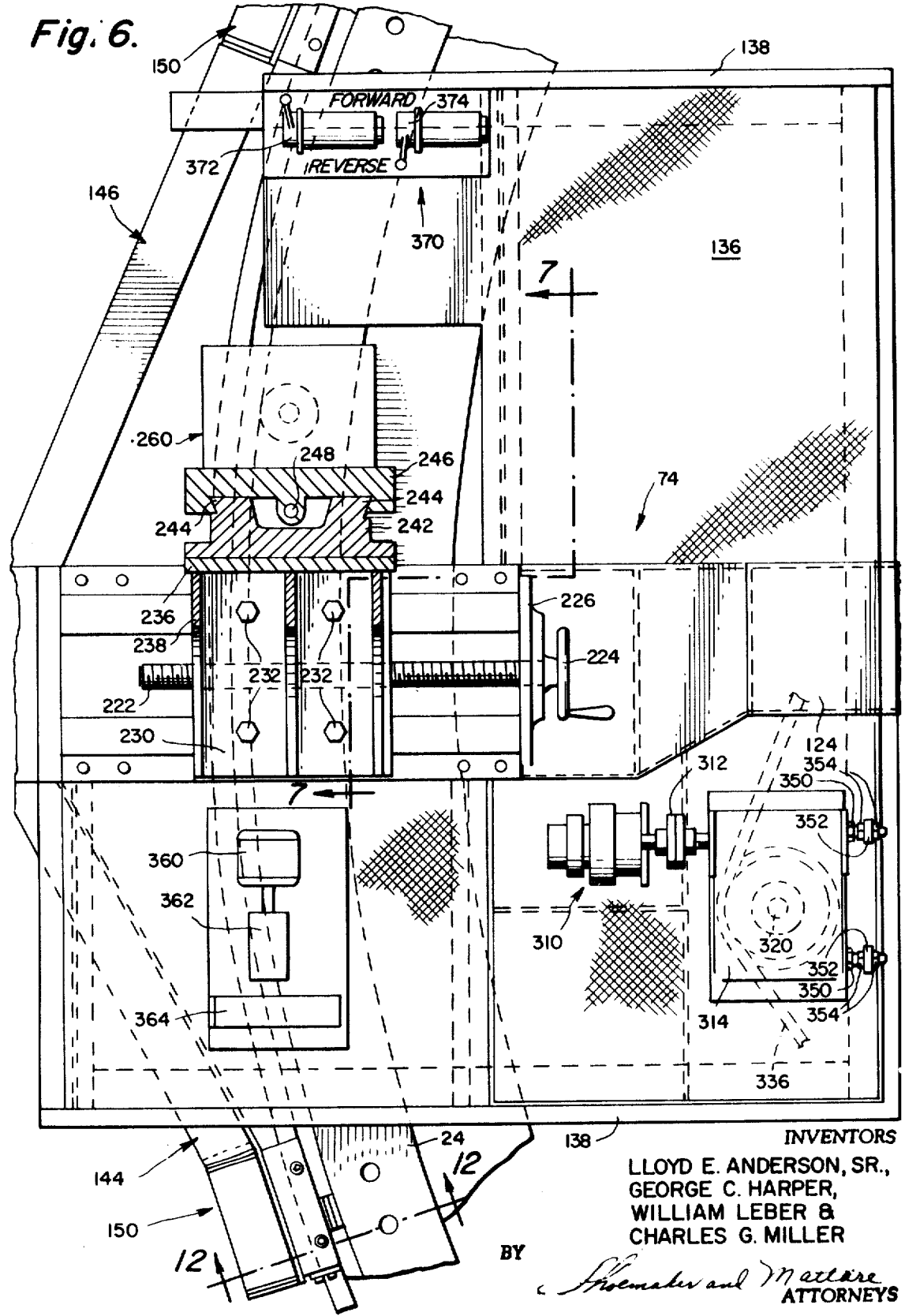

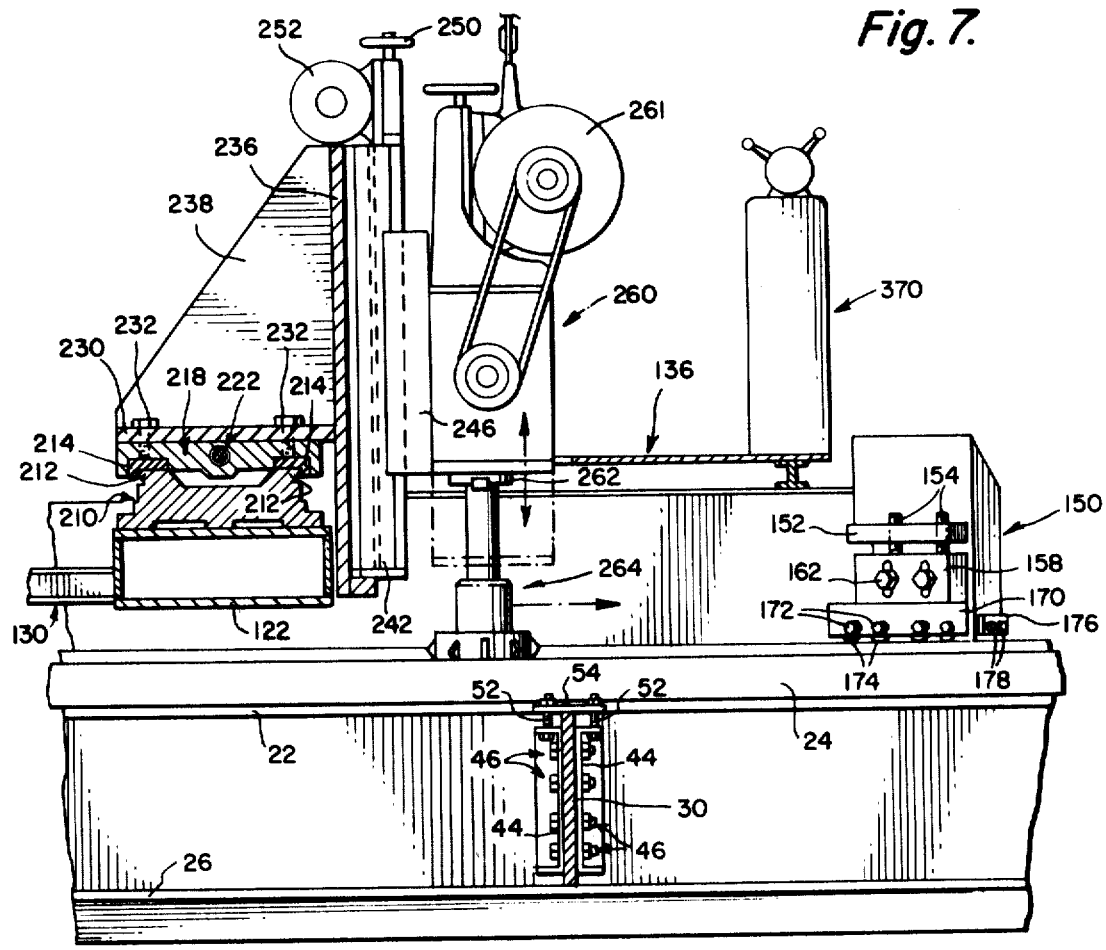

PATENTED SEP 7 1971

INVENTORS
LLOYD E. ANDERSON, SR.,
GEORGE C. HARPER,
WILLIAM LEBER &
CHARLES G. MILLER

BY
*Shoemaker and Mattare*
ATTORNEYS

WORK-MOUNTED MACHINING AND FINISHING DEVICE

BACKGROUND OF THE INVENTION

The present invention relates to a milling and drilling machine which is adapted to machine a large workpiece at a location either in a shop or in the field.

Accordingly, in this type of application, it is desirable to provide a field milling and drilling machine which is portable and can be readily transported to the location where the workpiece is to be machined. The workpiece can then be assembled, and the machining operations can be carried out in situ.

The Antifriction of the present invention can also carry grinders, planer tools, boring tools and the like, and accordingly is not limited to milling and drilling operations, although it is especially suitable for such operations.

Apparatus of the type contemplated by the present invention is suitable for circular milling and drilling of large workpieces having for example a diameter of 20 to 100 or more feet. Large storage tanks such as vacuum vessels are a typical example of workpieces which may be machined with the present invention. Nuclear containment vessels and many other applications will also be readily apparent to one skilled in the art.

In a typical example, two portions of a tank may have cooperating flanges which are to be mated in face-to-face engagement with one another and which must have a very accurate interengagement. In such instances, the apparatus of the present invention may be utilized for milling and drilling these annular flanges as necessary. The lower wall of a tank may have an annular flange about the outer surface thereof which must be milled flat and provided with one or more grooves for receiving an O-ring. Additionally, the flange may also require drilled holes or receiving nut and bolt assemblies. This flange is adapted to cooperate with a companion flange having a flat undersurface for engaging the milled flat upper surface of the aforementioned flange, the companion flange also having holes aligned with the holes in the first-mentioned flange for receiving such nut and bolt assemblies.

In order to properly machine a flange on a tank wall, the field milling and drilling apparatus must first be supported in operative position relative to the tank and two or more rough passes made on the upwardly facing surface of the flange to mill the face thereof. One or more fine cuts are then made to finish off this upper face. If necessary, additional cuts may be made in order to acquire a suitable flat planar surface. Annular O-ring grooves can then be cut into the surface, and suitable holes drilled through the flange as required. The flange may then be counterbored.

After one flange has been milled and drilled as aforedescribed, the companion flange is placed over the finished flange and holes are scribed on the companion flange through the drilled holes in the finished flange whereupon holes may then be drilled through the companion flange; and the two flanges may subsequently be bolted together.

Any large-flanged pressure or vacuum vessel may be machined with the apparatus of the present invention particularly in those instances where the engaging surfaces of the flanges formed on portions of the vessels must be machined to close tolerances. Premachining of portions of a workpiece which are to be assembled on the job site severely limit the accuracy when large workpieces are involved due to distortions which occur when the structure is finally assembled.

SUMMARY OF THE INVENTION

The present invention provides an arrangement which may be assembled after the workpiece has been erected, and the workpiece can be machined at the jobsite after it has been assembled. This eliminates the problem involved in premachining of portions of the structure, and the erected workpiece may be machined to close tolerances.

The present invention includes support means which is adapted to be attached directly to the workpiece adjacent to the portions to be machined. A pivot arm means is mounted on the support means for pivotal movement about an axis, and this pivot arm means carries the machining means for performing the machining operation. Means is provided for adjusting both the radial and vertical position of the machining means with respect to the pivot arm means so that the position of the machining means can be very accurately adjusted.

Guide means is also provided which is adapted to be secured to the outer surface of the associated workpiece and is operatively interconnected with the pivot arm means for accurately guiding the pivot arm means and the machining means supported thereby with respect to the workpiece.

A positive drive means is interconnected between the support means and the pivot arm means so that the pivot arm means can be positively driven at a desired predetermined rate with respect to the workpiece to carry out the machining operation.

Antifriction means is provided on the pivot arm means for facilitating pivotal movement thereof, and a counterweight mechanism is operatively interconnected with the vertical adjustment means so that the vertical position of the machining means can be readily manually adjusted.

BRIEF DESCRIPTION OF THE DRAWINGS:

FIG. 2 is a sectional view on an enlarged scale taken substantially along line 2—2 of FIG. 1 looking in the direction of the arrows;

FIG. 3 is a sectional view on an enlarged scale taken substantially along line 3—3 of FIG. 2 looking in the direction of the arrows;

FIG. 4 is a sectional view on an enlarged scale taken substantially along line 4—4 of FIG. 3 looking in the direction of the arrows;

FIG. 5 is a top perspective view illustrating a portion of the drive mechanism shown in FIG. 3;

FIG. 6 is an enlarged view partly in section looking down on a portion of the structure shown in FIG. 1;

FIG. 7 is a sectional view taken substantially along line 7—7 of FIG. 6 looking in the direction of the arrows;

FIG. 8 is a sectional view illustrating the manner in which O-ring grooves are formed in the flange of an associated workpiece;

FIG. 9 is a cross section of a portion of a finished workpiece;

FIG. 10 is a section similar to FIG. 9 illustrating a further finished workpiece;

FIG. 11 is a sectional view similar to FIGS. 9 and 10 illustrating still another finished workpiece;

DESCRIPTION OF THE PREFERRED EMBODIMENT

Figure 1:
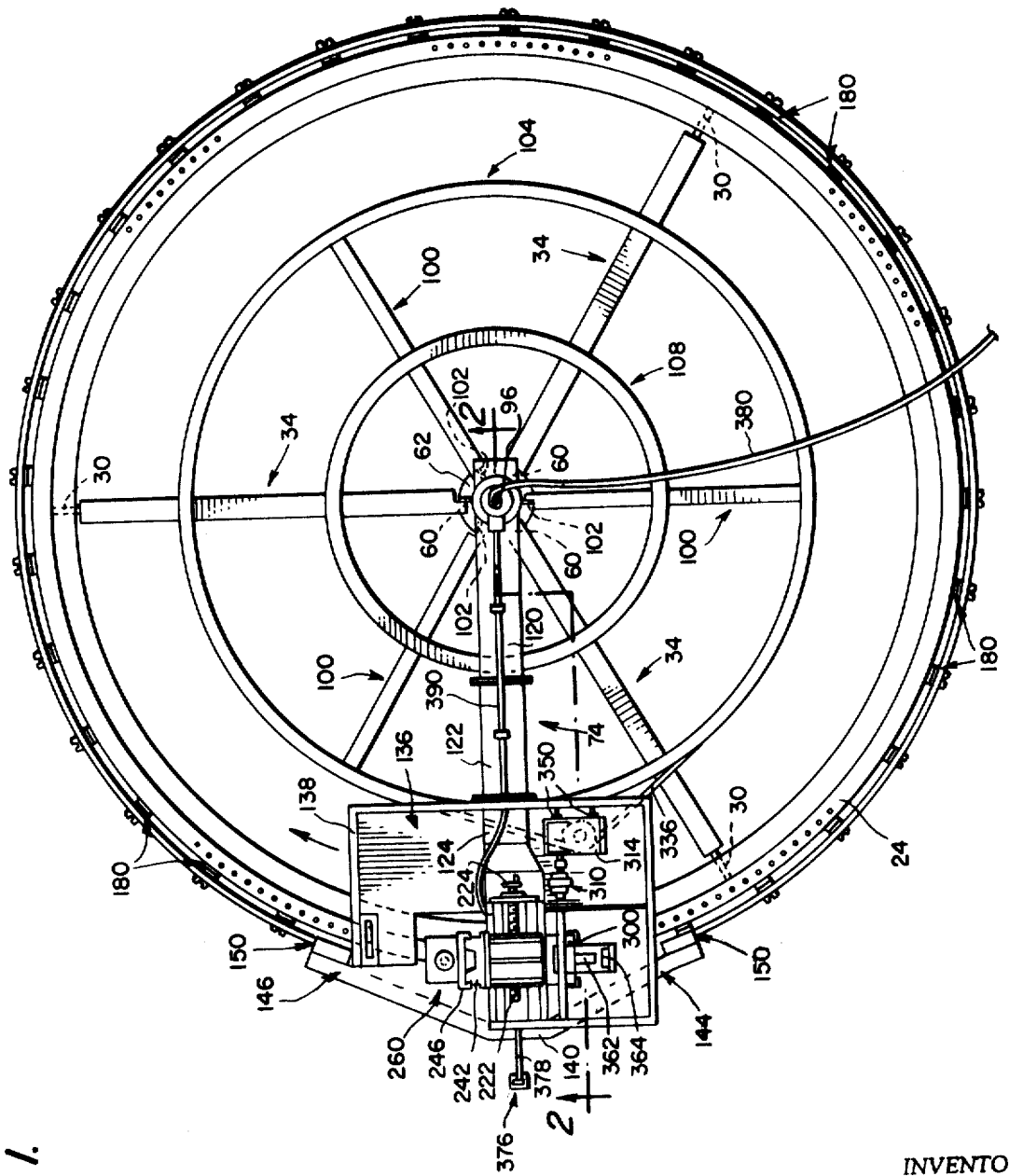
FIG. 1 is a top view illustrating the apparatus of the present invention supported in operative position relative to a workpiece.

Referring now to the drawings wherein like reference characters designate corresponding parts throughout the several views, as seen most clearly in FIG. 2, a generally cylindrical sidewall of a workpiece such as a tank is indicated by reference character 20, this sidewall having a radially inwardly directed peripherally extending flange 22 rigidly secured to the upper edge thereof. An attaching flange 24 is rigidly secured to the upper part of the tank, this flange 24 defining an upper surface which is to be machined by the apparatus of the present invention and which is adapted to be secured to a companion flange to provide a seal therewith as hereinafter more fully described. A further radially inwardly directed peripherally extending flange 26 is provided on the inner sure of the tank, and a radially outwardly directed peripherally ending flange 28 is provided on the outer surface of the k.

ls seen most clearly in FIG. 1, three spaced plates 30 are dly secured as by welding to the inner surface of the :wall of the tank, and as seen in FIG. 2, each of these plates may be positioned intermediate the two flanges 22 and 26. ese plates 30 serve as means for attaching the pivot support ans to the tank. The pivot support means as seen most arly in FIG. 1 includes three generally radially extending iport members 34, and as seen in FIG. 2, each of these radi-/ extending members 34 includes three girder portions of terally I-beam cross-sectional configuration 36, 38 and 40 ich are bolted to one another. The outer end of each of se radially extending members 34 is attached to one of the tes 30 through the intermediary of a pair of plates 44 which most clearly illustrated in FIGS. 2 and 7.

iach of these plates 44 is provided with a first plurality of es formed therethrough which are aligned with suitable es formed in girder portion 36 for receiving nut and bolt as-iblies 46 for securing the plates to member 36. Each of tes 44 also includes a plurality of vertically elongated slots ich are adapted to be aligned with suitable holes provided he associated plate 30 for receiving nut and bolt assemblies for securing the plates 44 to one of the plates 30.

Vertical adjustment bolts 52 extend through suitable holes ivided in the upper flanges of plates 44 and a plate 54 :ured to the upper surface of plate 30, these bolts having table nuts thereon for holding them in operative position en they have been properly adjusted. A horizontal adjust-nt screw 56 is threaded through a bore provided in a boss secured to the upper surface of girder member 36. The ver-al adjustment bolts and the horizontal adjustment screw ible accurate adjustment of each of the generally radially ending support members 34.

The inner end of each of the radially extending members 34 rigidly secured as by bolting to a vertically extending plate , plates 60 being joined at the lower ends thereof by a dis-ke plate 62 as seen in FIG. 2, and the inner edges of each of ites 60 being secured to a vertically extending generally lindrical rod 64. This elongated rod 64 is symmetrical about axis X—X which comprises the pivot axis about which the paratus is adapted to pivot.

A plate 70 is supported by the upper ends of plates 60, and a ther plate 72 is rigidly attached to a pivot arm means 74 d is supported for pivotal movement about rod 64 by a first nular bearing 76 disposed intermediate plates 70 and 72 d a second annular bearing 78 disposed between plate 72 d rod 64.

A plate 80 is rigidly attached as by welding to the opposite le of the pivot arm means 74, this plate 80 being supported r rotation by a first annular bearing 82 and a second annular aring 84. Bearing 82 is interposed between plate 80 and a ite 90, a further plate 94 being in turn interposed between ite 90 and a plate 92 rigidly attached to the upper end of rod . A vertically extending power lead support member 96 is ached to the upper end of rod 64, and serves to support the wer lead means hereinafter described.

As seen most clearly in FIG. 1, three additional generally dially extending support members 100 are secured as by ilting to vertically extending plates 102 rigidly attached to d 64 and plate 62 previously described. The outer ends of pport members 100 are rigidly secured as by bolting or the e to an outer annular support member 104 which may be bricated of a plurality of sections. This annular support ember 104 has a generally I-beam cross-sectional configura-m. This annular support member is also rigidly attached to e upper surface of the generally radially extending support embers 34 previously described. A second annular and con-ntric support member 108 is also of generally I-beam cross-ctional configuration and is rigidly attached as by bolting or e like to the radially extending members 34 and 100.

As seen most clearly in FIG. 2, the pivot arm means 74 extends substantially radially of the apparatus and has the inner end thereof secured to plates 72 and 80 which in turn are mounted for pivotal movement about the axis of rod 64. The pivot arm means includes three sections 120, 122 and 124 which are bolted to one another, the sections being of generally rectangular cross-sectional configuration to provide maximum strength and rigidity.

antifriction means 128 in the form of a slider bearing and housing is carried by the undersurface of section 120 of the pivot arm means, this antifriction means bearing upon the upper part of the annular support member 108 to facilitate pivotal movement of the pivot arm means with respect to the associated support means. Any suitable antifriction means may be employed such as antifriction wheels or slides and the like.

A platform or framework 130 is carried by the outer end of the pivot arm means, this platform being of sufficient size to support a man who can walk around thereon, a handrail 138 being provided about the outer periphery thereof to prevent a workman from falling off the platform. As seen in FIG. 2, the platform includes a depending skirt portion 130 and a stiffener girder 142 attached thereto. As seen most clearly in FIG. 1, the platform includes depending skirt portions 144 and 146 extending in angular relationship to the central skirt portion 140, these latter skirt portions 144 and 146 serving to support antifriction wheel assemblies 150 thereon. Each of these antifriction wheel assemblies 150 is of substantially the same construction, and the details thereof are seen most clearly in FIGS. 7 and 12.

Each of these wheel assemblies 150 includes a radially inwardly extending member 152 having a pair of vertical adjustment screws 154 threaded through suitable holes provided therein. The lower ends of these adjustment screws are adapted to engage the upper surface of a member 158 having a pair of vertically elongated slots 160 formed therethrough. These slots are adapted to receive capscrews 162 which are threaded into suitable holes provided in a member 164 rigidly attached to the wheel assembly.

The undersurface of each of members 158 is rigidly attached to an angle member 170. Pivot members 172 are supported by each of angle members 170, and an antifriction wheel 174 is journaled for rotation on each of pivot members 172. The wheels are shown as being four in number on each of the wheel assemblies 150. These wheels are adapted to ride along a guide means hereinafter described. A doctor blade 176 is secured by screws 178 to each of the wheel assemblies and is adapted to engage the guide means to remove undesirable foreign matter therefrom.

While antifriction wheels are disclosed, other suitable antifriction means such as slides can be used where the weight of the unit is not excessive.

Figure 12:
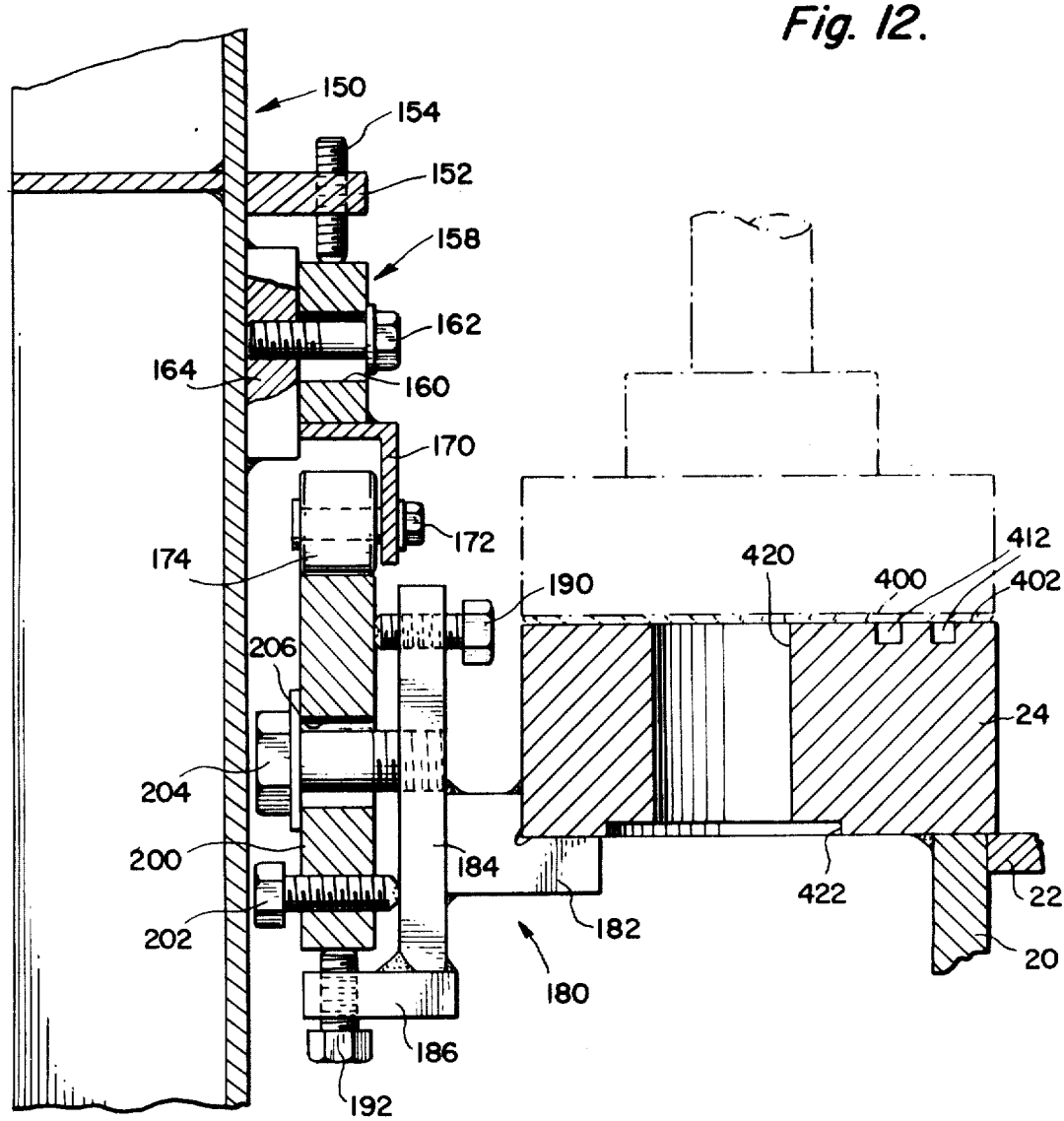
FIG. 12 is an enlarged sectional view taken substantially along line 12—12 of FIG. 6 looking in the direction of the arrows.

A plurality of guide support brackets are indicated generally by reference numeral 180, these guide support brackets being secured at spaced intervals about the outer periphery of the tank and being secured to the lower outer portion of the flange 24 as seen most clearly in FIG. 12. Each of these guide support brackets includes a first member 182 rigidly attached as by welding to flange 24. Member 182 is in turn rigidly secured as by welding to a vertical member 184 which in turn has a horizontal member 186 rigidly secured as by welding to the lower end thereof. Adjusting bolts 190 and 192 extend through suitable threaded holes provided in members 184 and 186 respectively.

These adjusting bolts are adapted to engage the side and lower edges respectively of an annular guide means 200. This annular guide means may be fabricated of a plurality of pieces to provide a closed annular guide means, the upper surface of which is adapted to support the antifriction wheel means 174 previously described.

An adjusting bolt 202 extends through a suitable threaded hole provided in the guide means and is adapted to engage member 184 of the support bracket. A capscrew 204 extends through an elongated slot 206 formed in the guide means and is threaded into a suitable threaded hole provided in member 184 of the support bracket. It is apparent that members 190, 192, 202 and 204 enable the guide means to be very accurately adjusted and locked in desired position relative to flange 24. Since the outer end of the pivot arm means is supported on the upper surface of the guide means through the intermediary of the antifriction wheel means 174, the guide means serves to accurately guide and adjust the horizontal position of the outer end of the pivot arm means.

The guide means can also be supported from other structures and in a different location from that shown, and should be supported in the proximity of the area being machined.

As seen most clearly in FIG. 7, a radial feed means includes a support portion 210 carried by the upper surface of the section 122 of the pivot arm means and including a pair of radially extending tapered guide portions 212. These tapered guide portions support complementary bearing portions 214 mounted within a radially movable feed table 218. As seen in FIG. 7, a radially extending jackscrew 222 is threaded within a suitable bore provided in the feed table 218 and is adapted to be operated by a handwheel 224 supported by a fixed bracket 226. Operation of handwheel 224 serves to manually adjust the radial position of the radial feed table.

A support plate 230 is attached to table 218 by a plurality of screws 232, plate 230 in turn being rigidly secured to a vertically extending plate 236. A plurality of gusset plates 238 are rigidly attached between plates 230 and 236 to rigidify the structure.

As seen most clearly in FIG. 6, is a vertically extending support portion 242 is carried by plate 236 and includes a pair of spaced vertically extending tapered guide portions 244 which are adapted to fit within complementary grooves formed in a vertical feed table 246. This vertical feed table 246 has a jackscrew 248 threaded within a suitable bore formed therethrough. This jackscrew is interconnected with a handwheel 250 supported at the upper end of members 236 and 242. A motor 252 as seen in FIG. 7 is also operatively interconnected with jackscrew 248 for alternatively enabling the vertical feed table 246 to be manually or power operated.

A conventional master machining head is indicated generally by reference numeral 260, this head being suitably secured as by bolting to the vertical feed table 246. This master machining head may in a typical example include a 20 horsepower motor 261 adapted to operate in the range of about 64 to 350 r.p.m. The machining head includes a spindle nose 262 which is secured to a suitable tool indicated generally by reference numeral 264 which as illustrated in FIG. 7 comprises a means for milling the upper surface of the flange 24 of the associated tank. It is apparent that the radial feed means as well as the vertical feed means including the radial feed table and the vertical feed table respectively provide means for accurately adjusting the position of the machining means 260 relative to the pivot arm means 74.

In order to facilitate movement of the machining means in a vertical direction, counterweight mechanism is provided. This counterweight mechanism may be most clearly understood from an inspection of FIGS. 2 and 13 of the drawings. Four vertically upstanding members 270 are provided, the lower ends of these members being supported by the platform previously described. Plates 272 are interconnected with the upper ends of each of members 270, and a pair of spaced generally parallel and radially extending I-beams 274 extend between adjacent pairs of plates 272.

Figure 13:
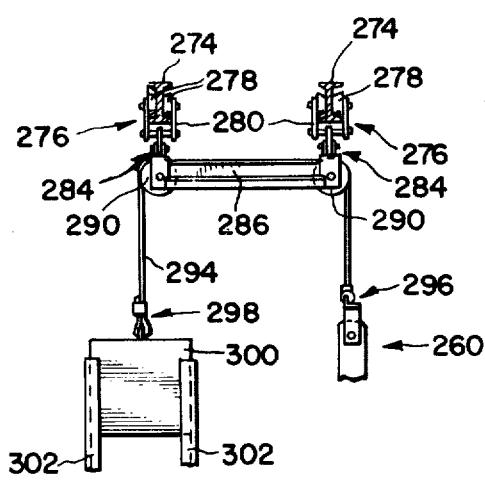
FIG. 13 is a sectional view taken substantially along line 13—13 of FIG. 2 looking in the direction of the arrows.

As seen most clearly in FIG. 13, trolley mechanisms 276 are provided for movement along each of the T-beam members 274. Each of these trolley mechanisms includes a pair of rollers 278 adapted to engage the lower flange of each of the I-beams at the opposite sides of the central webs thereof. The trolley means includes depending hanger portions 280 which support snatch blocks 284. These snatch blocks are rigidly interconnected by angle means 286, each of the snatch blocks carrying a sheave 290 over which is reeved a wire rope 294.

One end of wire rope 294 is secured by an attaching means 296 to the upper portion of the master machining head. The opposite end of the wire rope is secured by an attaching means 298 with a large counterweight 300 which is guided in its vertical movement by a plurality of angle guide members 302.

The drive means for causing pivotal movement of the pivot arm means with respect to the associated support structure includes a hydraulic motor 310 which is supported by the platform. This hydraulic motor is drivingly connected through a coupling mechanism 312 with a speed reducer 314. This speed reduces includes an output shaft which as seen most clearly in FIGS. 3 and 4 carries at the lower end thereof a drive sprocket 322 of conventional construction.

As seen in FIGS. 3–5 inclusive, a rack member 330 of annular construction has radially extending teeth 332 formed in the outer periphery thereof and is rigidly secured as by welding to the annular support member 104 previously described. A drive chain 336 is disposed in surrounding relationship to the rack and in driving interengagement with the teeth formed thereon, this drive chain also being in driving engagement with the drive sprocket. It is apparent that rotation of the drive sprocket will cause the drive sprocket and pivot arm means operatively interconnected therewith to move relative to the chain which is anchored to the rack 330 attached to the fixed supporting structure. Accordingly, rotation of the drive sprocket will cause the pivot arm means to rotate around the axis of support member 64.

A plurality of spaced chain support brackets 340 are provided about the outer periphery of support member 104, these support brackets including a block member 342 connected with the undersurface thereof and with member 104 to reinforce the structure. It will be noted that the support brackets are of such a construction that the outer end portion thereof defines a downwardly sloping surface 344 so that if the chain should droop downwardly, it will be picked up and guided by this curved end portion so as to be moved back into proper operative relationship for engagement with the rack member 330. The chain support bracket 340 will prevent excessive drooping of the chain during operation of the apparatus.

As seen in FIG. 6, means is provided for adjusting the position of the speed reducer 314 with respect to the platform for adjusting the tension in the chain associated with the output drive sprocket of the speed reducer. This adjustment means includes a pair of generally radially extending adjustment screws 350 which are threaded through suitable lugs 352 secured to the platform. Locknuts 354 are threaded on the adjustment screws to lock the adjustment screws in adjusted position.

The rack member could also be mounted on the guide means and the drive sprocket suitably repositioned in a modified arrangement. The guide means itself might also be provided with teeth for directly engaging the drive sprocket to provide the desired positive drive.

A power unit includes a motor 360 drivingly interconnected with a hydraulic pump 362, a reservoir 364 being provided for hydraulic fluid. This pump may be connected with the aforedescribed motor means for driving the motor means. A control panel 370 includes manually operable valve means 372 and 374 for controlling flow of hydraulic fluid through the hydraulic motor means so that the operation of the apparatus can be readily controlled by an operator standing on the platform. In addition, a control panel 376 is suspended from a support means 378 carried by the platform so that a workman can control operation of the apparatus from a position outside the workpiece when desired.

A suitable source of electrical energy is interconnected with power lead means 380 which as seen most clearly in FIG. 2 is adapted to be supported by support means 96 whereby the electric power may be fed to the rotating apparatus at the central part of the structure from a position disposed thereabove. This power lead means is interconnected with a slip ring means 382 fixed to support means 96.

Pickup fingers 384 are adapted to engage the slip ring 282 in the usual manner, these pickup fingers being carried by a support means 386 rigidly attached to the pivot arm means and movable therewith. An electrical cable means 390 is operatively connected with the pickup fingers and is adapted to provide electrical energy to the electrically operated components provided on the platform at the outer end of the pivot arm means.

After the milling and drilling apparatus has been assembled in operative position with respect to the workpiece, the pivot arm means is driven around the workpiece while the tool of the machining means serves to mill the upper face of the flange 24. As seen in FIG. 12, the original height of the upper surface of the flange is indicated in phantom line by reference numeral 400. The necessary number of rough cuts and fine cuts are made to acquire a flat planar finished surface 402.

After the milling operation is completed, a router bit 410 as illustrated in FIG. 8 may be substituted for the cutting tool of the machining means, and the pivot arm means may again be moved about the workpiece so as to cut a pair of concentric O-ring grooves 412 in the upper surface 402 of the flange. These O-ring grooves are adapted to receive O-rings in the final assembled tank or the like.

After the grooves 412 have been formed in the flange, a conventional drill tool may be incorporated in the machining means. The points at which holes are to be drilled through the flange are suitably scribed thereon by precision means, and the holes are then drilled utilizing the machining means of the present invention. No clamping pressure is required during the milling operation, but during the drilling operation, it may be desirable to clamp the components in place. After hole 420 has been drilled through the flange as shown in FIG. 12, the flange is counterbored as indicated at 422 on the undersurface hereof.

After flange 24 has been machined and drilled as aforedescribed, the companion flange may be placed over finished flange 24, and the places at which the holes are to be drilled through the companion flange are scribed through the drilled holes already formed in flange 24.

The milling and drilling apparatus of the present invention may be utilized for providing different finished configurations to an associated flange. As seen in FIG. 9, the apparatus may be employed for providing a flange 430 with a sloping upper surface 432 so that the flange tapers to a smaller dimension in cross section from the outer periphery toward the inner periphery thereof. O-ring grooves 434 have been formed in the upper surface 432, and a drilled hole 436 is provided through the flange.

Referring now to FIG. 10, still another flange 440 is illustrated as formed by the present invention. This flange includes a double-sloped upper surface 442, 444 defining a flange which tapers from its maximum cross-sectional dimension at the central part thereof toward the minimum dimension at the inner and outer peripheries thereof. O-ring grooves 446 are formed in the upper surface portion 444 thereof, and a drilled hole 448 is provided through the flange.

FIG. 11 illustrates still another flange 450 formed with the apparatus of the present invention. This flange includes a sloping upper surface 452 which provides the finished flange with a cross section dimension tapering to a smaller dimension in cross section at the outer periphery thereof. O-ring grooves 454 are formed in the upper surface 452 of the flange, and a drilled hole 456 is formed through the flange.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A work-mounted machining and finishing device comprising pivot support means, pivot arm means support by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof and including a supporting guide surface mounted adjacent the portion of the workpiece on which work is to be performed, said guide surface supporting and guiding said pivot arm relative to said workpiece, and drive means for drivingly moving said pivot arm means with respect to an associated workpiece.

2. Apparatus as defined in claim 1 wherein said radial feed means includes a generally horizontally disposed radial feed table and guide means for guiding radial movement of said feed table.

3. Apparatus as defined in claim 2 wherein said vertical feed means includes a vertical feed table carried by said horizontal feed table.

4. Apparatus as defined in claim 1 wherein said vertical feed means includes a vertical feed table and guide means for guiding vertical movement of said feed table.

5. Apparatus as defined in claim 4 including counterweight means operatively interconnected with said vertical feed table to facilitate movement thereof.

6. Apparatus as defined in claim 1 wherein said guide means is of annular construction and includes an upwardly directed guide surface.

7. Apparatus as defined in claim 6 including means for supporting said guide means on the outer surface of an associated workpiece.

8. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof, drive means for drivingly moving said pivot arm means with respect to an associated workpiece, said guide means being annular in construction and including an upwardly directed guide surface, and means for supporting said guide means on the outer surface of an associated workpiece, said support means for the guide means being adjustable.

9. Apparatus as defined in claim 8 wherein said support means for said guide means is adjustable in a radial direction.

10. Apparatus as defined in claim 8 wherein said support means for the guide means is adjustable in a vertical direction.

11. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof, drive means for drivingly moving said pivot arm means with respect to an associated workpiece, said guide means being annular in construction and including an upwardly directed guide surface, and guide wheel means operatively interconnected with said pivot arm means, said guide wheel means being interengageable with said guide surface of the annular guide means for guiding movement of said pivot arm means.

12. Apparatus as defined in claim 1 wherein said drive means includes a positive operative driving connection between said pivot arm means and the associated support means.

13. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof, drive means for drivingly moving said pivot arm means with respect to an associated workpiece, said drive means including a positive operative driving connection between said pivot arm means and the associated support means, said driving connection including a rack portion fixed to said support means, and a chain means drivingly interconnected with said rack portion, and means drivingly interconnecting said chain means with said pivot arm means.

14. Apparatus as defined in claim 13 wherein said support means includes an annular member, said rack portion being fixedly interconnected with said annular member.

15. Apparatus as defined in claim 13 including power-operated drive means supported by said pivot arm means and being interengageable with said chain means.

16. Apparatus as defined in claim 15 including means for adjusting the position of said power-operated drive means.

17. Apparatus as defined in claim 13 including a plurality of support brackets supported adjacent said chain means for engaging and supporting said chain means.

18. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof, drive means for drivingly moving said pivot arm means with respect to an associated workpiece, said pivot support means including a plurality of generally radially extending members interconnected with a central portion, and means for interconnecting the outer ends of said members with an associated workpiece.

19. Apparatus as defined in claim 18 wherein said pivot support means includes at least one annular support member interconnected with said generally radially extending members.

20. Apparatus as defined in claim 19 including antifriction bearing means supported by said annular support member and operatively associated with said pivot arm means for facilitating pivotal movement of the pivot arm means.

21. Apparatus as defined in claim 1 wherein said pivot arm means includes antifriction wheel means disposed at the outer end thereof and being interengageable with said guide means for guiding movement of said pivot arm means.

22. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means guide means operatively interconnected with said pivot arm means for guiding movement thereof, drive means for drivingly moving said pivot arm means with respect to an associated workpiece, said pivot arm means including antifriction wheel means disposed at the outer end thereof and being interengageable with said guide means for guiding movement of said pivot arm means, the position of said wheel means being adjustable with respect to said pivot arm means.

23. Apparatus as defined in claim 21 wherein said wheel means includes a pair of spaced assemblies supported by the outer end of said pivot arm means.

24. Apparatus as defined in claim 21 including doctor blade means supported by said pivot arm means adjacent said antifriction wheel means.

25. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof, drive means for drivingly moving said pivot arm means with respect to an associated workpiece, said support means including a plurality of generally radially extending members and an annular support member supported by said generally radially extending members, antifriction means supported by said annular means and cooperating with said pivot arm means to facilitate pivotal movement thereof, antifriction wheel means supported by the outer end of said pivot arm means and engageable with said guide means for guiding movement of the pivot arm means, said guide means being of annular construction, means for supporting said guide means on the outer surface of an associated workpiece, said drive means including a rack carried by said support means, and means interconnected with said pivot arm means and drivingly interconnected with the rack for positively driving said pivot arm means about said axis.

26. A work-mounted machining and finishing device comprising pivot support means, pivot arm means supported by said pivot support means for pivotal movement about an axis, machining means carried by said pivot arm means and including tool drive means, radial feed means for adjusting the radial position of said machining means with respect to said pivot arm means, vertical feed means for adjusting the vertical position of said machining means with respect to said pivot arm means, guide means operatively interconnected with said pivot arm means for guiding movement thereof, at least one annular support member carried by said pivot support means intermediate the ends of said pivot arm, cooperating means on said pivot arm in engagement with said support member to support said pivot arm, and drive means mounted directly on said pivot arm means for drivingly moving said pivot arm means with respect to an associated workpiece.